July 15, 1924.  1,501,210

D. I. FLATT

PULP AND JUICE SQUEEZER

Filed Feb. 17, 1923

Inventor
David I. Flatt

By John F. Mullaney
Attorney.

Patented July 15, 1924.

1,501,210

UNITED STATES PATENT OFFICE.

DAVID I. FLATT, OF COLORADO SPRINGS, COLORADO.

PULP AND JUICE SQUEEZER.

Application filed February 17, 1923. Serial No. 619,700.

*To all whom it may concern:*

Be it known that I, DAVID I. FLATT, a citizen of the United States, residing at Number 1014 West Colorado Avenue, in the city of Colorado Springs, county of El Paso, and State of Colorado, have invented a new and useful Pulp and Juice Squeezer, of which the following is a specification.

My invention relates to pulp and juice squeezers in which it is desired to squeeze hot or cold juice from the pulp through a cloth filter as a cloth sack, or to squeeze hot grease or oil from the pulp or cracklings, or for similar uses with other fluids and other pulp, and the first object of my invention is to provide an appliance that will facilitate the separation of hot juices or oils from a pulp without burning or staining the hands of the operator; second to extract juices or oils from a pulp while very hot without squirting the oils or juices; and third, to do a thorough effective job of it without injury to the operator or her clothing.

I attain these objects by means of the appliance illustrated in the accompanying drawing, in which—

Figure 1:
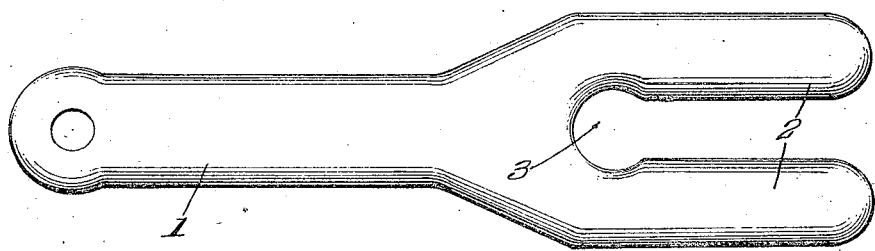
Figure 2:
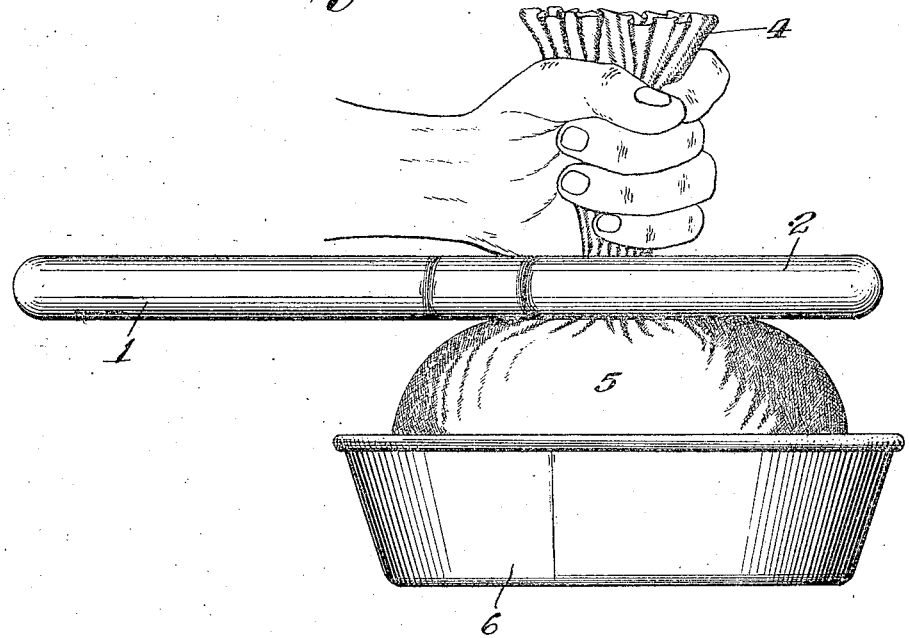

Figure 1, is a plan view of the appliance on approximately a scale of one half the diameters of the original appliance, and Fig. 2, is a side elevation of the appliance in use with a bag of crushed fruit ready to have the juices squeezed therefrom.

Similar designating numerals refer to similar parts throughout the different views.

This appliance is made of wood so as to be a comparatively poor conductor of the heat from the hot contents of the sack 5 which we will represent for illustration as containing hot crushed berries; and 1, is the handle of the appliance with which the operator forces the prongs 2, 2, downwardly with an oscillating twisting motion against the sack 5 which is held in the round recess 3 while the other hand of the operator may hold the top 4 of the sack 5 in its proper place on 3. This top is protected from the squirting juices by means of the interception of the prongs 2, 2, between the hand at the top 4 of the sack and the bottom of the sack. The dish 6 with part of its side removed to disclose the sack within, may be any receptacle chosen by the operator. The hole 7 is provided to hang the squeezer on a hook or nail away from dirt or from dripping into vessels or on the floor. Housewives sometimes use a cloth or napkin instead of a sack for the same purpose by twisting the opposite edges thereof together and forcing them between the prongs 2, 2, into the recess 3. The rolling oscillating downward pressure squeeze is the effective means for extracting the last drops of juices or oils from the pulp.

Having thus described my invention, I claim—

1. A juice and pulp squeezing appliance comprising a smooth formed body having a broad handle at one end, the opposite end terminating in two rounded prongs with a rounded recess at their junction with said handle.

2. An appliance for squeezing juices or oils from a pulp in a filtering sack or cloth, comprising an integral body consisting of a handle member at one end and of two rounded blunt prongs at the opposite end with a rounded recess in the fork of said prongs provided to hold the top or neck of said sack or cloth.

3. A pulp and juice squeezer comprising an integral body having a flattened handle at one end and two rounded prongs forming the opposite end and provided to grasp the neck of a sack or folded cloth containing pulp, and juice or oils substantially as set forth.

DAVID I. FLATT.

Witnesses:
JOHN F. MULLANEY,
MARGARET A. BRENNAN.